(12) United States Patent
Clark (10) Patent No.: US 10,978,890 B2
(45) Date of Patent: Apr. 13, 2021

(54) PORTABLE MULTIPLE MOBILE ELECTRONIC DEVICE CHARGING STATION WITH INTEGRATED SPEAKER

(71) Applicant: VOLTBOX, LLC, Celebration, FL (US)

(72) Inventor: Kenneth E. Clark, Celebration, FL (US)

( * ) Notice: Subject to any disclaimer, the term of this patent is extended or adjusted under 35 U.S.C. 154(b) by 382 days.

(21) Appl. No.: 16/350,384

(22) Filed: Feb. 6, 2018

(65) Prior Publication Data
US 2020/0303931 A9    Sep. 24, 2020

Related U.S. Application Data

(63) Continuation-in-part of application No. 15/462,138, filed on Mar. 17, 2017, now Pat. No. 10,243,377, and a continuation-in-part of application No. 15/363,124, filed on Nov. 29, 2016, now Pat. No. 10,003,204, and a continuation-in-part of application No. 13/998,785, filed on Dec. 9, 2013, now Pat. No. 9,509,153.

(51) Int. Cl.
| | |
|---|---|
| H02J 7/00 | (2006.01) |
| H01R 24/64 | (2011.01) |
| H01R 24/66 | (2011.01) |
| H02J 7/34 | (2006.01) |
| H04R 1/02 | (2006.01) |
| H01R 107/00 | (2006.01) |

(52) U.S. Cl.
CPC ............ *H02J 7/0027* (2013.01); *H01R 24/64* (2013.01); *H01R 24/66* (2013.01); *H02J 7/0013* (2013.01); *H02J 7/0014* (2013.01); *H02J 7/0042* (2013.01); *H02J 7/0044* (2013.01); *H02J 7/0045* (2013.01); *H02J 7/342* (2020.01); *H04R 1/028* (2013.01); *H01R 2107/00* (2013.01); *H02J 7/00* (2013.01); *H02J 2207/40* (2020.01)

(58) Field of Classification Search
CPC combination set(s) only.
See application file for complete search history.

(56) References Cited

U.S. PATENT DOCUMENTS

| | | | |
|---|---|---|---|
| 9,654,606 B1* | 5/2017 | Warren | H02G 11/02 |
| 2012/0280647 A1* | 11/2012 | Perez | G09F 23/06 |
| | | | 320/107 |
| 2013/0320913 A1* | 12/2013 | Chen | G06F 1/263 |
| | | | 320/103 |

* cited by examiner

Primary Examiner — Arun C Williams (57) ABSTRACT

A network enabled portable charging station for it mobile electronic devices comprising a rectangular shaped housing, one or more removable battery packs, a main charging board, a plurality of interchangeable cord housing cartridges, a wireless speaker, and an adjustable faceplate. The plurality of cord housing cartridges comprising retractable charging cords, each of the retractable charging cords having a USB connector end for connecting to the charge and cell balancing circuit board, and a device connector end for connecting to a mobile electronic device. The faceplate is configured to be retractable or removable from the housing body, and with one or more USB ports for receiving a USB-enabled charging cord, and a plurality of charge ports.

9 Claims, 11 Drawing Sheets

PORTABLE MULTIPLE MOBILE ELECTRONIC DEVICE CHARGING STATION WITH INTEGRATED SPEAKER

CROSS REFERENCE TO RELATED APPLICATIONS

This application is a continuation-in-part of earlier filed U.S. non-provisional application Ser. No. 15/462,138, filed on Mar. 3, 2017, which in turn is a continuation-in-part of earlier filed U.S. application Ser. No. 15/363,124, filed on Nov. 29, 2016, which is in turn a continuation-in-part of earlier filed U.S. application Ser. No. 13/998,785, filed on Dec. 9, 2013, the contents of which are herein incorporated by reference in then entireties.

BACKGROUND TO THE INVENTION

Current mobile phones use more battery power for all of the applications and the battery life of the phone is depleted rapidly causing the need to recharge the device more often. Typically a person does not carry a charging device or a wireless speaker with them and if so they often may not have access to a power outlet. The present invention for charging mobile phones in public places will offer a much needed convenience. The advertising space offers businesses an incentive to offer the convenience.

SUMMARY OF THE INVENTION

The present invention relates to a portable multiple mobile electronic device charging station with integrated wireless speaker (also referred to herein, for simplicity, as "charging station") for charging multiple portable electronic devices, e.g. from two up to eight mobile devices. The charging station comprises a plurality of device charging cables configured to enable charging of connected electronic devices from the charging station simultaneously, at up to 5 $V_{DC}$ per device, and a wireless speaker, the charging station network-enabled and compliant with one or more wireless communication protocols, such as Bluetooth® and/or WiFi protocols (e.g., IEEE 802.11a, 802.11b, 802.11g, 802.11n and 802.11ac), so that a portable electronic device may wirelessly connect to the charging station for output of audio content from the portable electronic device via the wireless speaker.

In one embodiment, the invention provides a portable charging station for multiple mobile electronic devices comprising a rectangular shaped housing with one or more integrated speakers, one or more battery packs that may be removable and/or rechargeable, a main charging board, a plurality of removable cord cartridges housing device charge cords, and an adjustable faceplate. The main charging board is configured as a charge and cell balancing circuit board located within the housing, the circuit board comprising a plurality of USB ports, in turn connected to the one or more battery packs. The plurality of cord housing cartridges house retractable charging cords, each of the retractable charging cords having a USB connector end for connecting to the charge and cell balancing circuit board, and a device connector end for connecting to a mobile electronic device. The faceplate may be configured with one or more openings accessing one or more USB ports, which in turn may engage a USB-enabled charging cord. The faceplate is further configured with a plurality of openings from which device connector ends of charging cords may protrude from the interior of the housing. The portable charging station is further configured with wireless communications. A system is also provided comprising one or more portable electronic devices connected via wireless communication to the wireless speaker of the portable mobile electronic charging device via a short-range communication link, such as Bluetooth or Wifi protocol.

In one embodiment, the one or more battery packs may be removable and/or rechargeable. Each battery pack may comprise a total capacity of at least 10 Ah and generally not more than 40 Ah, although capacity is not limiting. The one or more battery packs may comprise a total capacity of about 20 Ah. For example, each battery pack may comprise a capacity of at least 5 Ah and not more than 20 Ah, e.g. each battery pack may comprise a capacity of about 10 Ah. The one or more battery packs may comprise an output, collectively or individually, of about 5V/2 A to about 5V/8 A. For example, the one or more (e.g. 2) battery packs may comprise an output, collectively or individually, of about 5V/4 A.

In another embodiment, the one or more battery packs comprise a primary battery pack and a secondary battery pack (and optionally a tertiary battery pack). Where the portable charging station comprises a primary and a secondary battery pack, the portable charging station may be further configured with a control mechanism that causes the power source to select current flow from one of the primary battery pack or the secondary battery pack to the charging board. Where the portable charging station comprises a primary, a secondary and a tertiary battery pack, the portable charging station may be further configured with a control mechanism that causes the power source to select current flow from one (or two) of the primary, secondary or tertiary battery pack to the charging board.

In another embodiment, the charging station may be configured to permit recharging of the one or more removable battery packs in situ by the application of an external voltage through a charging port located in the housing. In addition or alternatively, the one or more removable battery packs may be removed from the portable changing station and charged externally.

In one embodiment, each of the removable cord housing cartridges comprise an enclosed casing configured with an (interior) removable/interchangeable cord spool mechanism for retracting cords used for charging mobile devices comprising: a single-sided spool comprising one of the retractable charging cords windably attached thereto, wherein the device connector end of the retractable charging cord is extendable from the spool for a distance of up to four feet, and is retractable. In another embodiment, the device connector end of the retractable charging cord may be extendable from the spool for a distance of up to three feet or up to two feet. Providing each of the cord housing cartridges as an individual enclosed casing provides a number of advantages. For example, the design allows each cord housing to be individually removed and replaced in the charging station in a straightforward manner. This may be done by adjusting the faceplate to expose a portion of the interior of the device, and then unplugging the USB connector of the relevant cord housing cartridge from the charge and cell balancing board, removing the relevant cord housing cartridge, inserting a replacement cord housing in its place and readjusting the faceplate to its normal (operating) position. This means that it is straightforward and economical to replace charging cords, such as damaged charge cords, and/or obsolete device connector ends.

The portable charging station may further comprising one or more access panels in the housing. Each of the one or more access panels may be configured to permit insertion and/or removal of at least one of the one or more removable battery packs through the housing. This provides a straightforward way to replace depleted removable battery packs at the end of their life. It also permits removal of rechargeable battery packs, allowing them to be charged externally. A portable charging station comprising one or more access panels in the housing may also comprise an access panel cover configured to cover a corresponding access panel. A portable charging station comprising one or more access panels in the housing may also comprise a corresponding access panel cover for each of the access panels.

The portable charging station may be further configured with one or more waterproof seals to provide a waterproof container when the lid is closed. The one or more waterproof seals may comprise at least one waterproof seal between the housing and the flip lid. Where the portable charging station comprises one or more access panels in the housing, the one or more waterproof seals may comprise at least one waterproof seal between the housing and the flip lid and at least one waterproof seal between the housing and each access panel cover. Where the portable charging station comprises an access panel along the bottom side of the housing, the one or more waterproof seals may comprise at least one waterproof seal between the housing and the access panel cover and/or along the bottom side of the housing.

In one embodiment, the charging station is configured with a protective outer layer surrounding all or a portion of the housing body, to protect the charging station from the elements, mishandling, and/or other mistreatment, e.g., protected from dirt, dust, water, shock, and the like. In one embodiment, the protective layer may be formed of a single element that wraps around the sides and/or bottom of the housing, or may be composed of separate elements. In certain embodiments, the protective layer is comprised of a rigid or semi-rigid material, such as polycarbonate, and/or of a flexible or semi-flexible material such as TPE, silicone, polypropylene, or other such rubber material, or combinations thereof. In one embodiment, the protective layer may completely cover the side surfaces of the charging station when the housing is encased within the protective layer, however, in some embodiments, the protective layer may cover less than the entire charging station surfaces, such as covering only a perimeter portion of the housing, thereby leaving any interactive touch portion or display panel freely visibly and accessible and uncovered. In another embodiment, the portable charging station may comprise at least one advertising message placed as a wrap, adhesive, and/or silk screening on the exterior of the housing (and/or lid) of the charging station. In another embodiment, the portable charging station may comprise at least one advertising message placed as a wrap, adhesive, and/or silk screening on the exterior of the protective outer layer encasing the charging station.

The portable charging station may further comprise a display panel. The display panel may be located on the front or a side panel of the housing. The display indicator may be configured to display operating status information, such as battery charge level and/or power status. The display panel may be configured as an interactive touch screen, or with one or more controls for controlling one or more functions of the charging station, such as power, batter selection, a timer function, and/or communication means such as Wi-Fi or Bluetooth.

In an embodiment, the network-enabled device provides a convenient method of charging a mobile electronic device and optionally providing audio output from the connected device via the wireless speaker, comprising connecting the mobile electronic device to a device connector end of a retractable charging cord of a portable charging station of the device of the invention, for example as described herein, and/or as embodied by the figures, and/or connecting the portable electronic device to the network-enabled charging station speaker via a wireless communication link, such as Bluetooth or WiFi.

DETAILED DESCRIPTION OF THE INVENTION

Described herein is a portable multiple mobile electronic device charging station comprising a housing; one or more wireless speakers; one or more battery packs comprising rechargeable battery cells; a main charging board configured for coupling to the one or more battery packs and plurality of charge cords, wherein the charging board is configured as a charge and cell balancing circuit board and is connected to a plurality of cord cartridges housing retractable charging cords adapted at one end for connection to a mobile device; and an adjustable faceplate configured with interface ports, wherein the charging station is network enabled and compliant with one or more wireless communication protocols, such as Bluetooth® and/or WiFi protocols (e.g. IEEE 802.11a, 802.11b, 802.11g, 802.11n and 802.11ac), so that a portable electronic device connected to the charging station by a wireless communication link or audio output cable may output audio content from the portable electronic device via the wireless speaker.

In one embodiment, the charging station further comprises a power on/off switch, and a display configured to display, such as on the front or side panel of the charging station, operating status information, such as battery charge level and/or power status. In another embodiment, the charging station comprises a removable protective outer layer that encases all or a portion of charging station housing to protect charging station from damage.

Depending on the number of charging cartridges configured within the portable charging station, the charging station is capable of providing a full charge for up to eight (or more) mobile devices simultaneously, or individually, providing convenient mobile charging of portable electronic devices at public places. For example, the charging station may provide a full charge for up to 2, 3, 4, 6, 7, 8 or 10 mobile devices. Suitable mobile devices include mobile phones and tablet devices, although in principle any device using a similar charging interface may be charged using a charging station of the invention. Examples of devices include, but are not limited to, mobile telephones (e.g. iphones, android phones, blackberries) tablets (e.g. ipads), laptop computers, wearable devices, and other similar devices as they may be designed.

In one embodiment, the charging station is configured with one or more battery packs comprising 1, 2, 3, 4, 5 or 6 removable and/or rechargeable battery packs. For example, the one or more battery packs may comprise more than one removable and/or rechargeable battery packs comprising battery cells or plurality of battery cells. The provision of more than one removable battery packs may be advantageous, for example when one removable battery pack is removed (e.g. for recharging and/or replacement), the remaining battery pack or battery packs remain in situ, permitting the charging station to continue charging any attached mobile devices from the power reserve of the remaining battery pack or battery packs. Multiple battery packs also permit expansion on high traffic tables, with charge rate verification of each channel set at a nominal 750 mA charge rate to improve charge experience and maximize battery capacity. In one embodiment, a battery may be a 12-volt battery, for example a 12-volt lithium ion battery. In another embodiment, a battery may have a capacity of 10000-30000 mAh, e.g. a capacity of about 20000 mAh. In yet another embodiment, the battery may have an input of about 5 V/2 A and/or an output of 5 V/4 A.

In one embodiment, the charging station is configured with a plurality of charge cord cartridges. A charge cartridge comprises a charge rate verification for each charging cartridge comprising a 750 mA charge rate. In one embodiment, an overall capacity ranges from 10000 to 30000 mAh capacity, such as 20000 mAh.

The charging station housing is approximately cuboid, e.g. a rectangular cuboid or cube shaped, comprising 4 side walls, a bottom side, and a top side comprising an adjustable interface plate. The four side walls and bottom side may be formed together as a single housing with inseparable parts. In other embodiment, the housing may be formed of an adjustable top section comprising a faceplate, and a bottom section or base section comprising a wireless speaker integrated into a bottom panel, or base, of the bottom section of the housing thereby forming a speaker pane, wherein the speaker panel is detachable from the housing. Alternatively, the housing comprises removable and detachable sections, comprising a top faceplate section, a main body section, and a base section, that connect to form the cube shaped housing. In one illustrative embodiment, the housing may have as overall dimensions, a length of 10-18 cm (e.g. 14.7 cm), height of 10-16 cm (e.g. 12.4 cm) and width of 10-18 cm (e.g. 11 cm), although alternate overall dimensions are possible. For example, a more compact design comprises a shorter length and width, or a larger design comprises a longer length and width, with the prerequisite design being a generally rectangular shape and a size permitting portability.

In on embodiment, charging station and its main components may be made of rigid, semi-rigid materials or flexible materials, such as plastics, resins, rubber, metals, such as steel or stainless steel, or other natural or synthetic materials commonly used in consumer electronics products. In one embodiment, the charging station comprises one or more seals, or combination of seal materials, in order to provide water resistance.

In one embodiment, to a top surface of charging board are mounted solid state devices and connectors comprising power discretes and/or passives comprising a voltage regulation circuit. In one embodiment, connectors are configured for reversible coupling to rechargeable battery packs, in another embodiment, the connectors are configured for connection to a standard AC plug adapter, to allow charging devices in the absence of batteries, or if batteries are depleted of charge as a back-up power source. In one embodiment, the charging board is configured for connection with charging cartridges via a USB connection between the USB connector end of the cartridge and the USB port of charging board. In another embodiment, charging board is also configured for connection to USB ports aligned with interface plate of the housing. In another embodiment, a control mechanism controls the selection of power to the device from a particular battery pack, such as a primary battery pack or secondary (reserve battery pack), to better manage capacity.

When a state of low power is detected to charge devices, or power drops below a minimum threshold for the charging station, a control mechanism associated with the power source then controls the engagement of the reserve battery pack, and the charge board circuit is switched, so that instead of drawing power from the primary battery pack, the circuit is switched to the secondary battery pack, whereby current is then drawn from the reserve battery pack, in order to maintain adequate threshold power levels to charge devices. This allows the primary battery pack to be removed from the charging station to be recharged or replaced, without disrupting the flow of power to connected devices. It will be understood by one skilled in the art that the charging current may be balanced in one of several ways from or among one or both battery packs, and that the embodiment described is merely one example of such an arrangement.

In another embodiment, the charging station is configured for remote operation, such as a power on and power off feature via wireless communication between an enabled remote control and the charging station, for turning the unit from an inactive state to an active state, and vice versa, for turning the speaker on/off, and to adjust volume output of the speaker. In yet another embodiment, the charging station is configured with a stand-by mode.

In one embodiment, the charging station comprises a display panel comprising an LED or other display screen configured to display a power status and/or a battery charge level. In yet another embodiment the display panel comprises a touch screen comprising means for initiating a device "on/off" state. In one embodiment, display connects to charging board, either by direct connection or by a wired connection.

In another embodiment, a portable charging device as described herein is network enabled and includes a speaker and integrated wireless technology to allow users of the device to distribute audio visual content wirelessly to the speaker via a suitably enabled portable electronic device (such as iPhone or android device) configured with compatible wireless communications, in combination with the ability to remotely send commands, such as voice-activated commands and/or commands via remote control, between the connected device and the speaker, and vice versa; and further comprising the portable electronic device connected, via a retractable charge cord of the charging station, to the charging station for charging of the portable electronic device, in accordance with the principles of the invention. In another embodiment, the portable charging device is configured with a wireless Bluetooth-enabled speaker, comprising a receiver antenna in communication with one or more sound signal amplifiers which are integrated with a circuit board; the speakers may be connected directly to the circuit board amplifiers to eliminate the need for a wiring harness for the speaker or a wiring harness may be used depending on the distance from the amplifiers. In another embodiment, wireless speaker comprises a speaker, a base and an acoustic cover comprising a mesh covering.

Wireless speakers are loudspeakers which receive audio signals using radio frequency (RP) waves, rather than over audio cables. The two most popular RF frequencies that support audio transmission to wireless loudspeakers include a variation of WiFi IEEE 802.11, while others depend on Bluetooth to transmit audio data to the receiving speaker. Wireless speakers may be comprised of two units: a main speaker unit combining the loudspeaker itself with an RF receiver, and an RF transmitter unit. The signal frequency range used commonly by wireless speakers is generally 900 MHz, transmitting over a range up to approximately 300 feet, however this frequency and range is illustrative and not intended to be limiting.

Bluetooth is a proprietary open wireless technology standard for exchanging data over short distances by using short wavelength transmissions operating in the 2.4 GHz frequency band from fixed and mobile devices. Bluetooth is managed by the Bluetooth Special Interest Group. In one embodiment the circuitry incorporates Bluetooth version 4.0 specifications known as the Bluetooth Core Specification Version 4.0. This version employs low energy, short range wireless signals. The Bluetooth Core Specification version 4.0 includes Classic Bluetooth. Bluetooth high speed and Bluetooth low energy protocols. Those skilled in the art would recognize that other earlier Bluetooth protocols are also suitable for use with this invention, and that updated versions, as they become available, would also be suitable for use with the invention.

In another embodiment, a portion of housing body, such as the four outer walls, may be optionally covered with an outer layer that covers all or a portion of the housing. In one embodiment, outer layer is a protective layer or "shell", comprised of one or more natural of synthetic materials that provides a protective barrier to the housing and inner components. The outer layer may be comprised of material (s) suitable as shock-absorbing material, in order to protect the device if dropped, or subjected to other forces of impact. In another embodiment, outer layer is comprised of materials that provide water resistance. In yet another embodiment, the outer layer further comprises one or more advertisements printed or affixed thereto, such as to the outward facing surface of the protective layer; alternatively, the advertisement may be applied as a separate layer, such as a silk wrap or adhesive layer, to the outer layer. It should be understood that the protective shell outer layer is an optional feature of the charging station that applies to all variations of the charging station presented herein and by the Figures, inclusive. Turning now to the Figures, where are shown a portable multiple mobile electronic device charging station according to various embodiments of the invention.

Figure 1A:
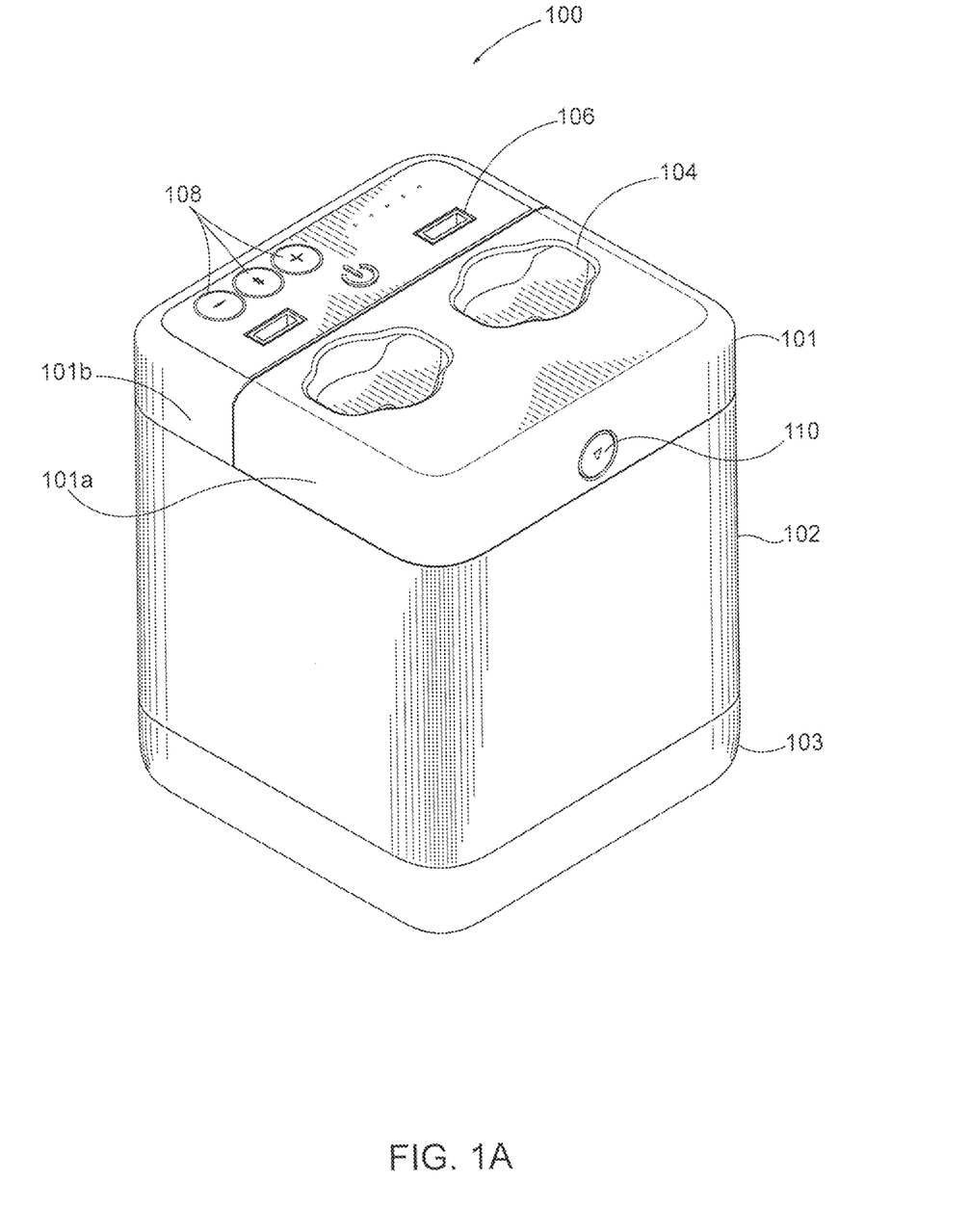
FIGS. 1A & 1B shows a side perspective view of a network-enabled charging station with integrated speaker according to one embodiment of the present invention, specifically a top-side view (A) and a bottom-side view (B).
Figure 1B:
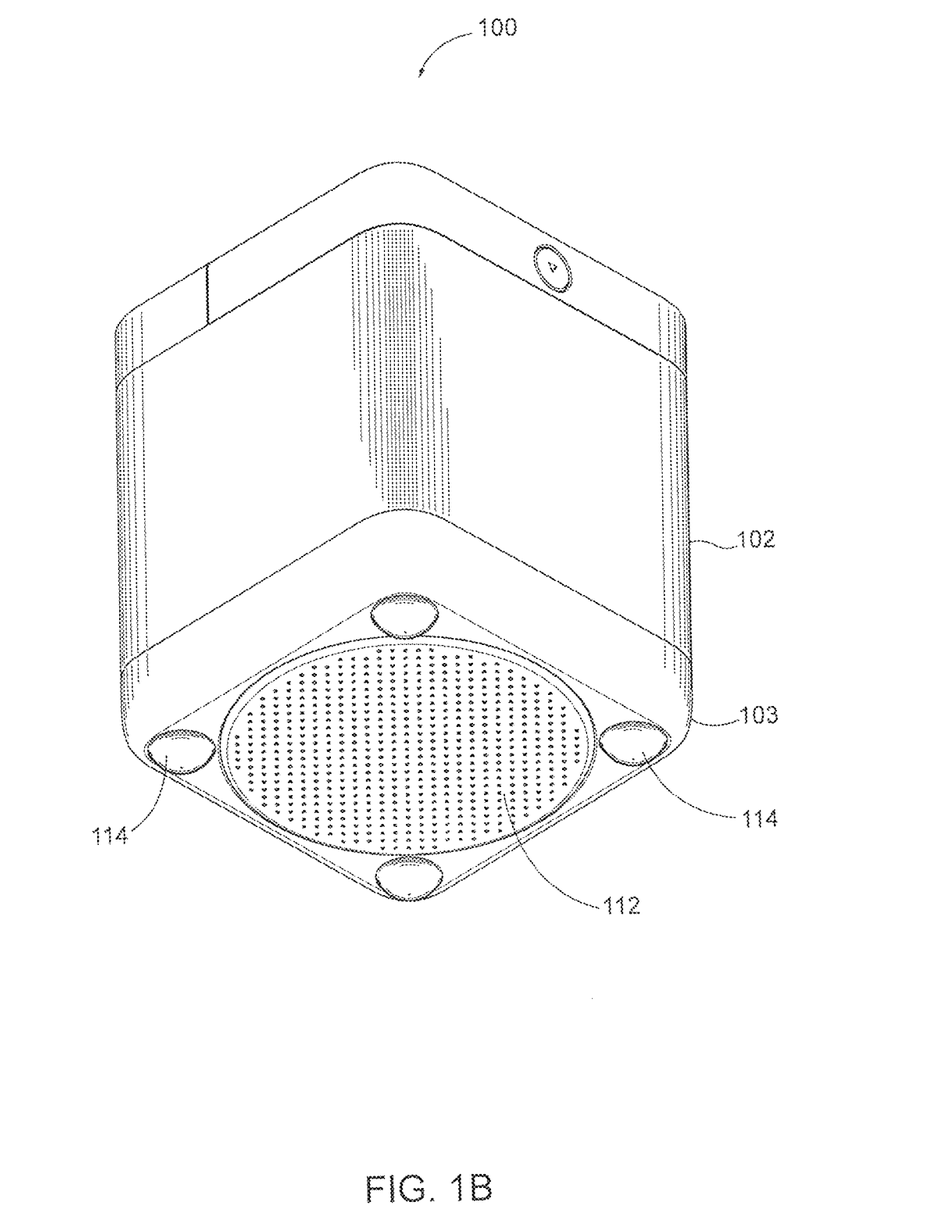

FIGS. 1A/1B represents a first embodiment of the present invention comprising a portable charging station comprising a wireless speaker. FIG. 1A shows a front side view of charging station 100 comprising a rectangular-shaped housing 102 with an adjustable (and optionally detachable) faceplate 101, with one or more of an adjustable feature 101a configured along a top portion of housing 102, and a base (optionally detachable) portion 103 configured at the bottom portion of the housing 102. Adjustable faceplate 101 includes one or more charge ports 104 and one or more USB ports 106, shown along the upper surface of faceplate 101. Charging station 100 also includes and one or more control features 108 (shown in FIG. 1A as a Bluetooth on/off button and volume control button, although others, such as WiFi connectivity and other control features may also be included) and a main power on/off control 110. FIG. 1B shows a bottom side view of charging station 100 including a speaker and acoustic cover 112 integrated into the base portion 103 of housing 102, and is shown exposed along the bottom surface. A plurality of feet 114 protrude at each corner from the base portion along the bottom surface of housing 102 in order to provide a clearance between the bottom surface of housing 102 and a surface on which the charging station 100 rests.

Figure 2:
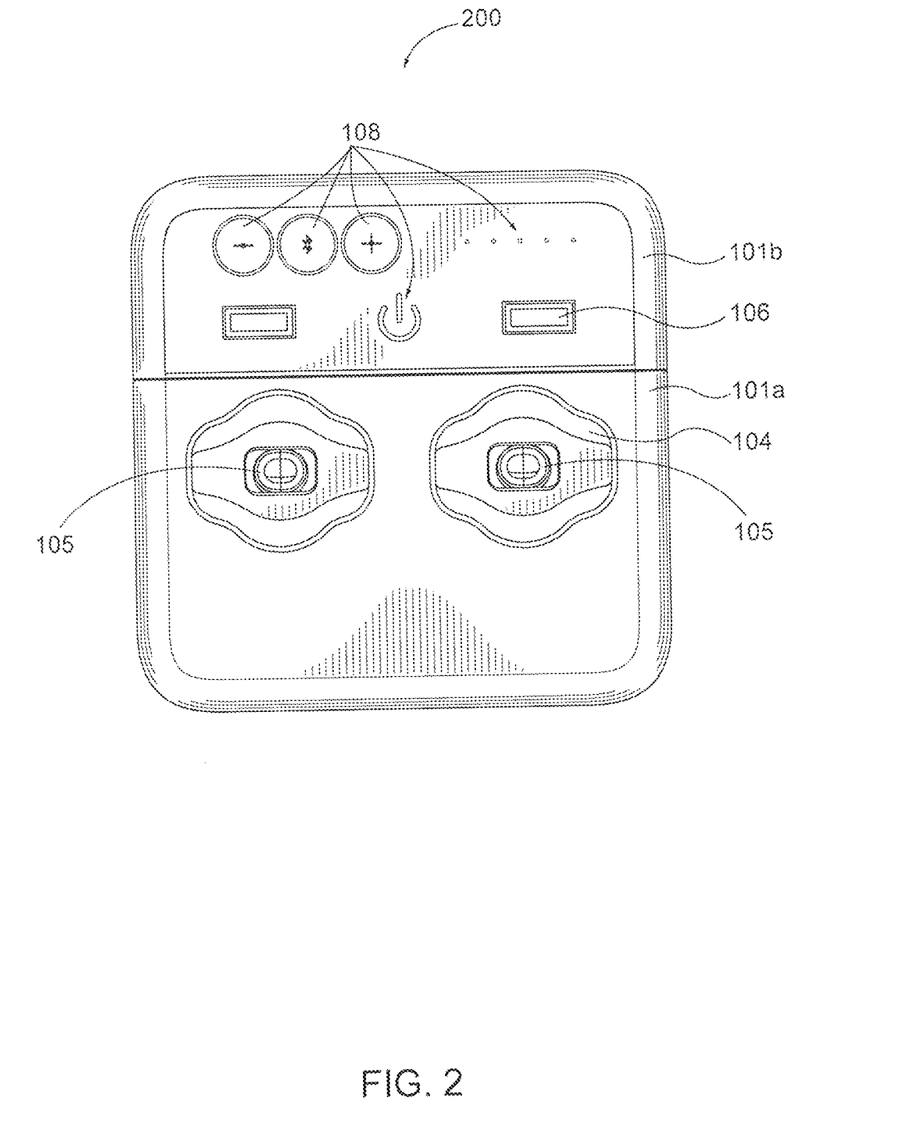
FIG. 2 shows a top view of the charging station according to one embodiment of the invention.

FIG. 2 shows a top-view detail of an adjustable faceplate 200 of a charging station with integrated wireless speaker, the faceplate 200 comprising a first member 101a and second member 101b, one or both of which are adjustable, in planar alignment along an upper portion of the charging station, and in close alignment so that the first and second member have adjacent edges aligned near a central portion of the upper surface of the faceplate, and appearing connected and "flush" along the upper surface of the charging station. In another embodiment, one or both members are configured as an adjustable member(s). The adjustable member(s) may be configured for slidable movement, such as along a sliding track, so that the adjustable member 101a may be moved along a plane in a direction opposite an opposite member, outward beyond the boundary of the housing body walls, thereby exposing the internal cavity of the housing; or alternately, the adjustable member 101a may be configured for movement about a hinge positioned between an outward edge of the adjustable member, connecting the outer edge of the adjustable member with the housing body at an end opposite the opposite member, so that the adjustable member may be "flipped" outward, away from the opposite member, at an angle ranging from 80° to 270°; or alternately, the adjustable member may be configured for a snap attachment to an upper portion of the housing body, permitting the adjustable member to be decoupled from the upper portion of the housing, thereby permitting access to the internal cavity of the charging device. Various suitable connection means are envisioned that allow the faceplate or an adjustable member of the faceplate to be coupled/uncoupled from the housing body, for example a hinged arrangement comprising a connector pin or other mechanism, such as a magnetic or snap closure. Also shown in FIG. 2 are a pair of charge ports 104 which each cradle a charge cord 105, a pair of USB ports 106, and a plurality of control features 108.

Figure 3A:
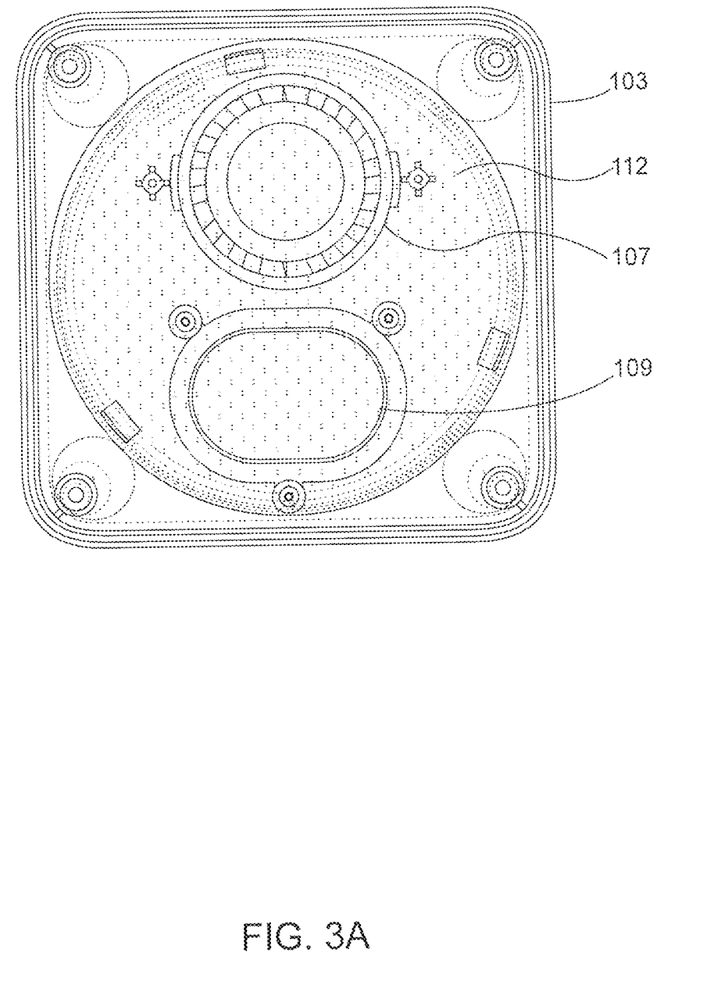
FIGS. 3A and 3B are bottom views of the charging station to show the integrated speaker components, comprising base, speaker and acoustic cover, according to one embodiment of the invention.
Figure 3B:
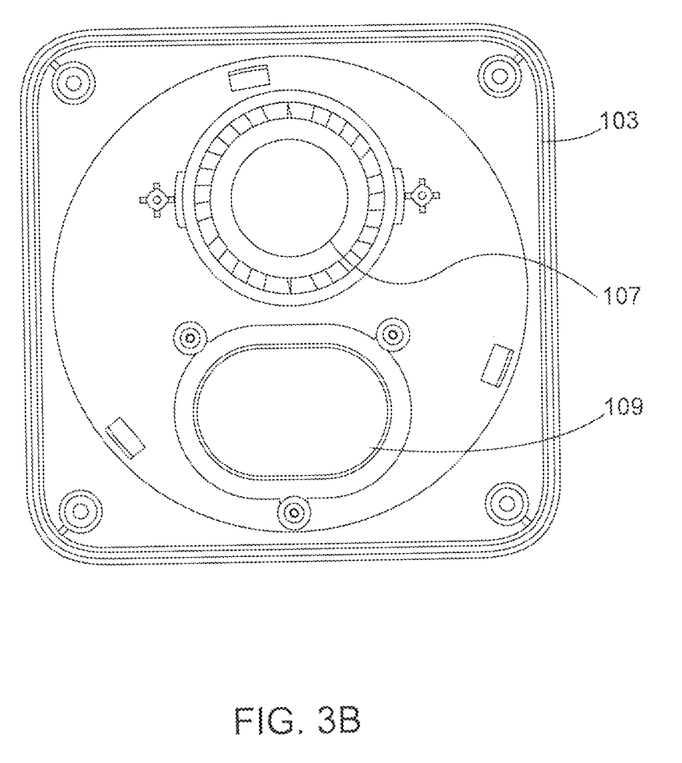
Figure 3C:
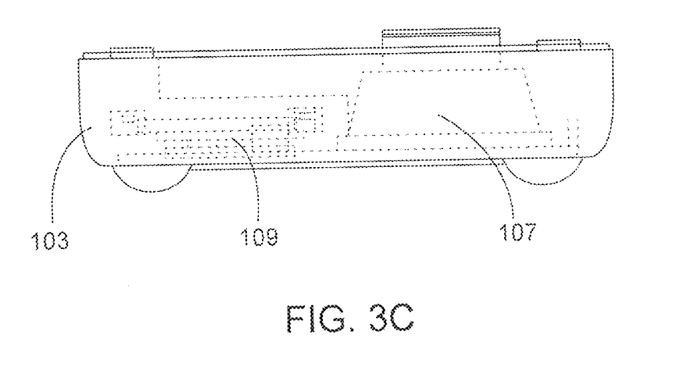
FIG. 3C is a bottom section side-view, showing the speaker section of the device housing, according to one embodiment of the invention.
Figure 4A:
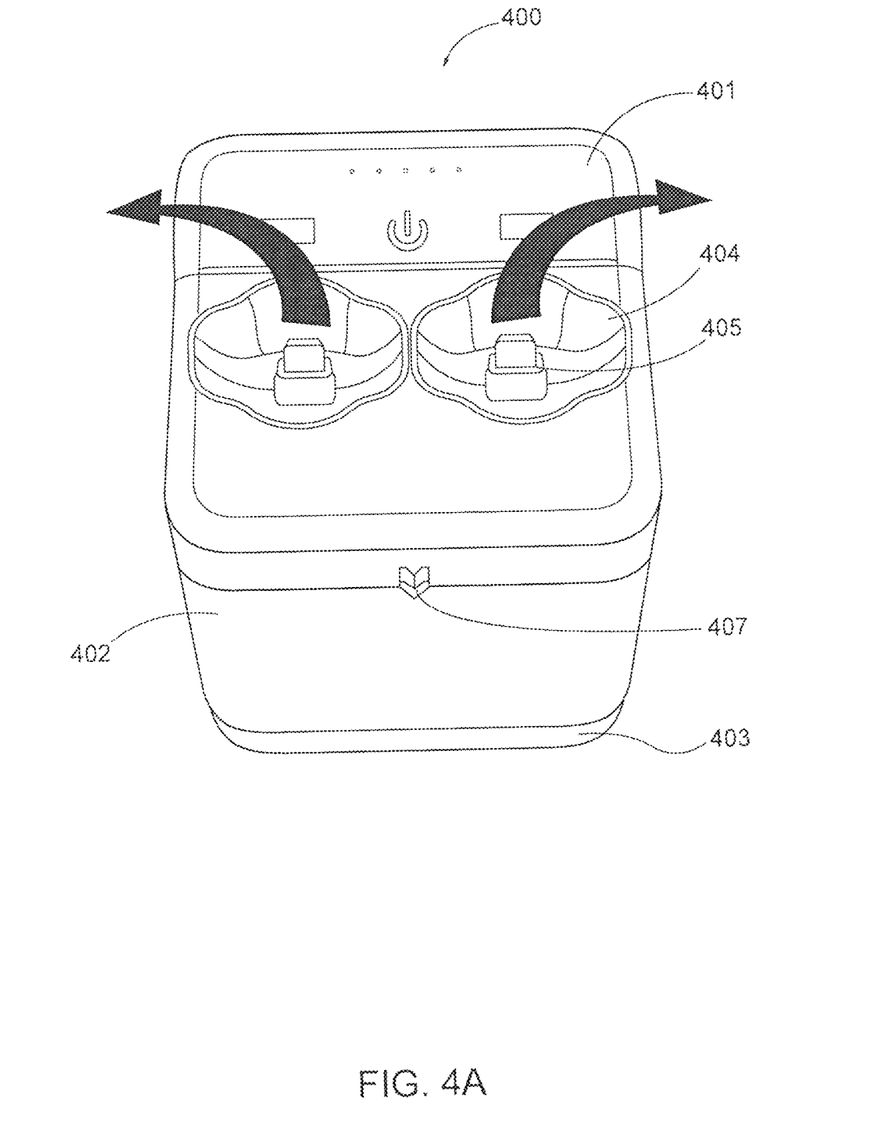
FIG. 4A-4D shows a series of top views of a network enabled charging station with integrated speaker according to one embodiment of the present invention illustrating how to adjust the faceplate of the charging for access to housing body interior and interchangeable charge cartridges and retractable charge cords.
Figure 4B:
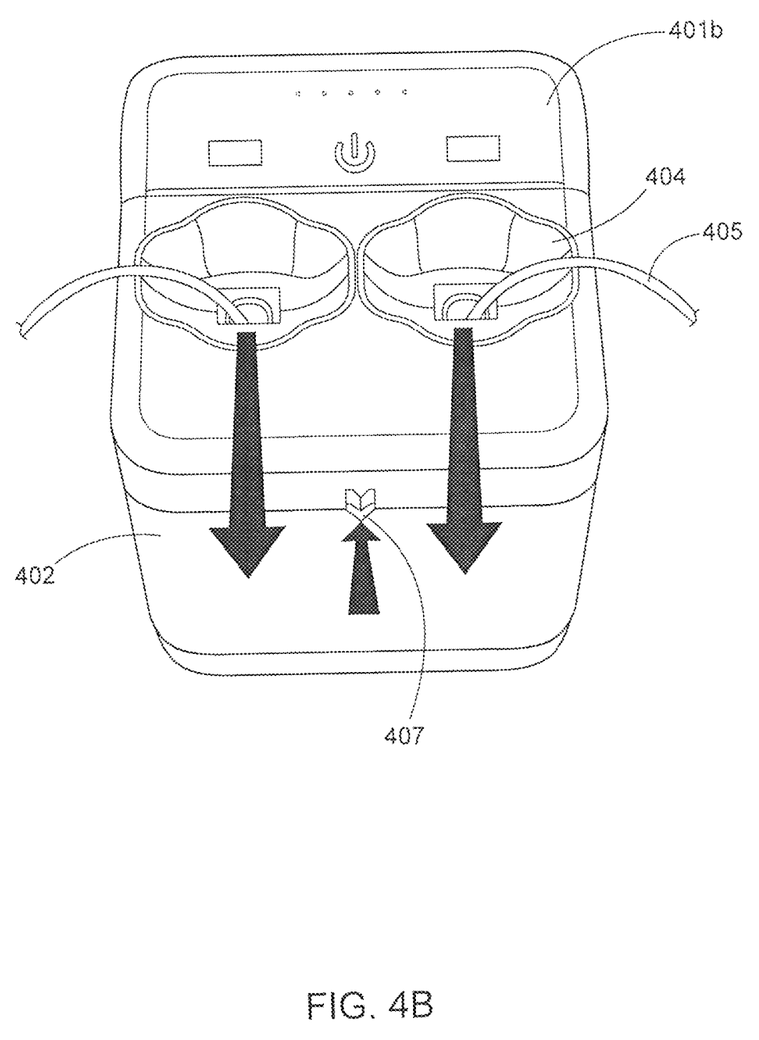
Figure 4C:
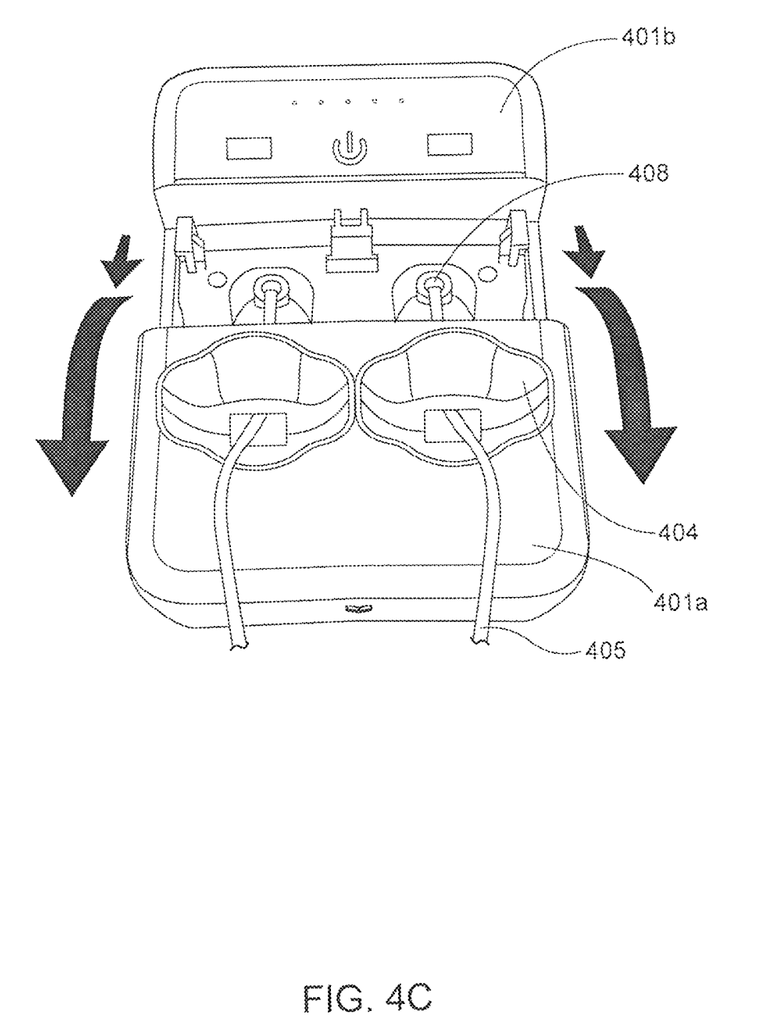
Figure 4D:
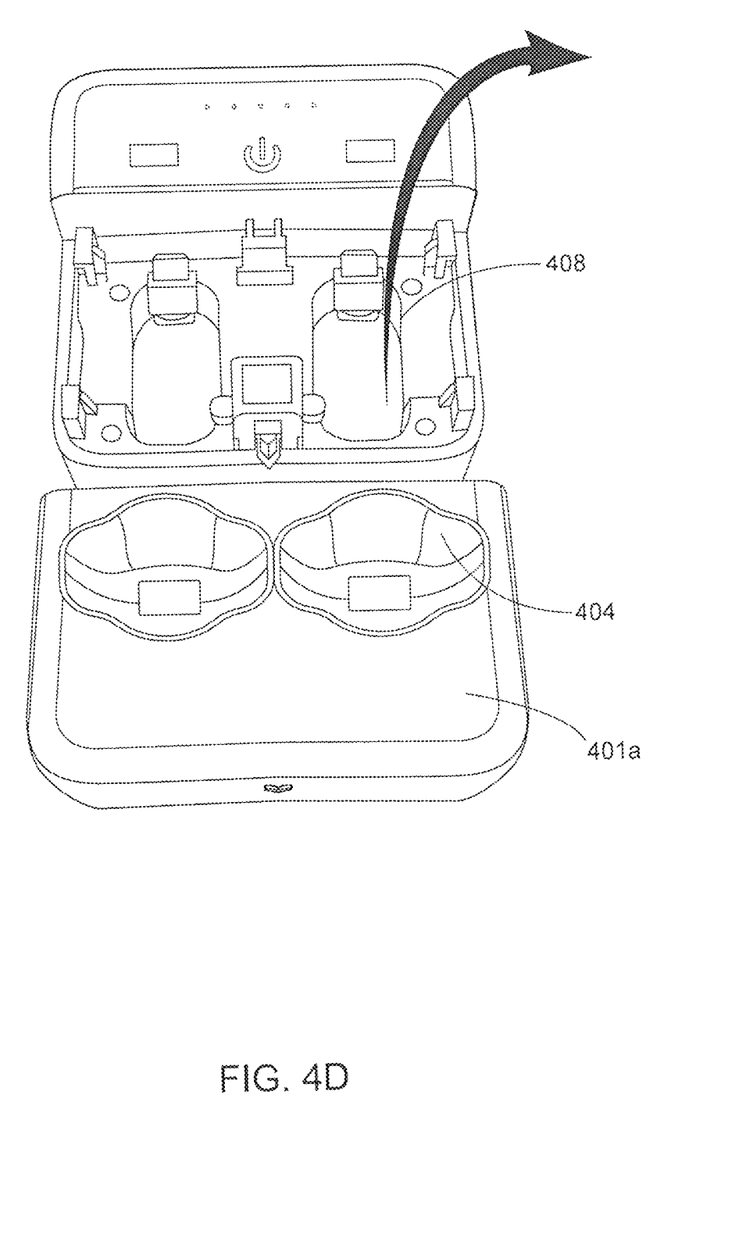

FIGS. 3A-3C are bottom views of charging station and show base 103 of housing with and without the acoustic cover (shown in FIG. 3A as mesh 112), as well as speaker 107 and base 109. FIG. 3C shows a side view of base 103 showing internal arrangement of speaker 107 and base 109. In one embodiment, speaker size is approximately 40 mm×40 mm×23 mm, although the size is illustrative only and not intended to be limiting. Likewise, a base may have dimensions of 38 mm×26 mm×2 mm. In another embodiment, an acoustic cover for speaker comprises a speaker mesh of dimensions 86 mm×86 mm by 5.5 mm FIGS. 4A-4D provide an overview and sequence for adjusting the faceplate 400 of the charging station for access to housing body interior and replacement of charge cords 405 and/or charge cartridges 408. FIG. 4A shows a first step in the replacement of one or more charge cord cartridges, comprising extending cords 405 outward from charge ports 404; as shown in FIG. 4B, while extending cords 405 from the ports 406 and clear of the charging station, pressing and holding (thereby releasing) a locking feature 407 to release adjustable member 401a from its position on the housing body 402 aligned with an opposite member 401b and facilitating sliding the adjustable member away from the opposite (stationery) member 401b, and away from the housing body 402; as shown in FIG. 4C, while keeping cords 405 extended, sliding adjustable member 401a to a fully extended position away from stationery member 401b, thereby exposing the cavity of the housing body and exposing charge cartridges 408; and as shown in FIG. 4D, while the adjustable member 401a is fully extended from the opposite stationery member of the faceplate, thereby exposing the charge cartridges 408, removing one or more of the charge cartridges 408 and replacing the one or more charge cartridges with a replacement cartridge, the replacement cartridge further comprising a replacement charge cord and/or replacement connector/adapter end, and placing the charge cord through the cavity 404 thereby aligning the charge cable to the exterior of the device for use. The adjustable faceplate is then fully realigned to its original position in order to resume operation.

Figure 5:
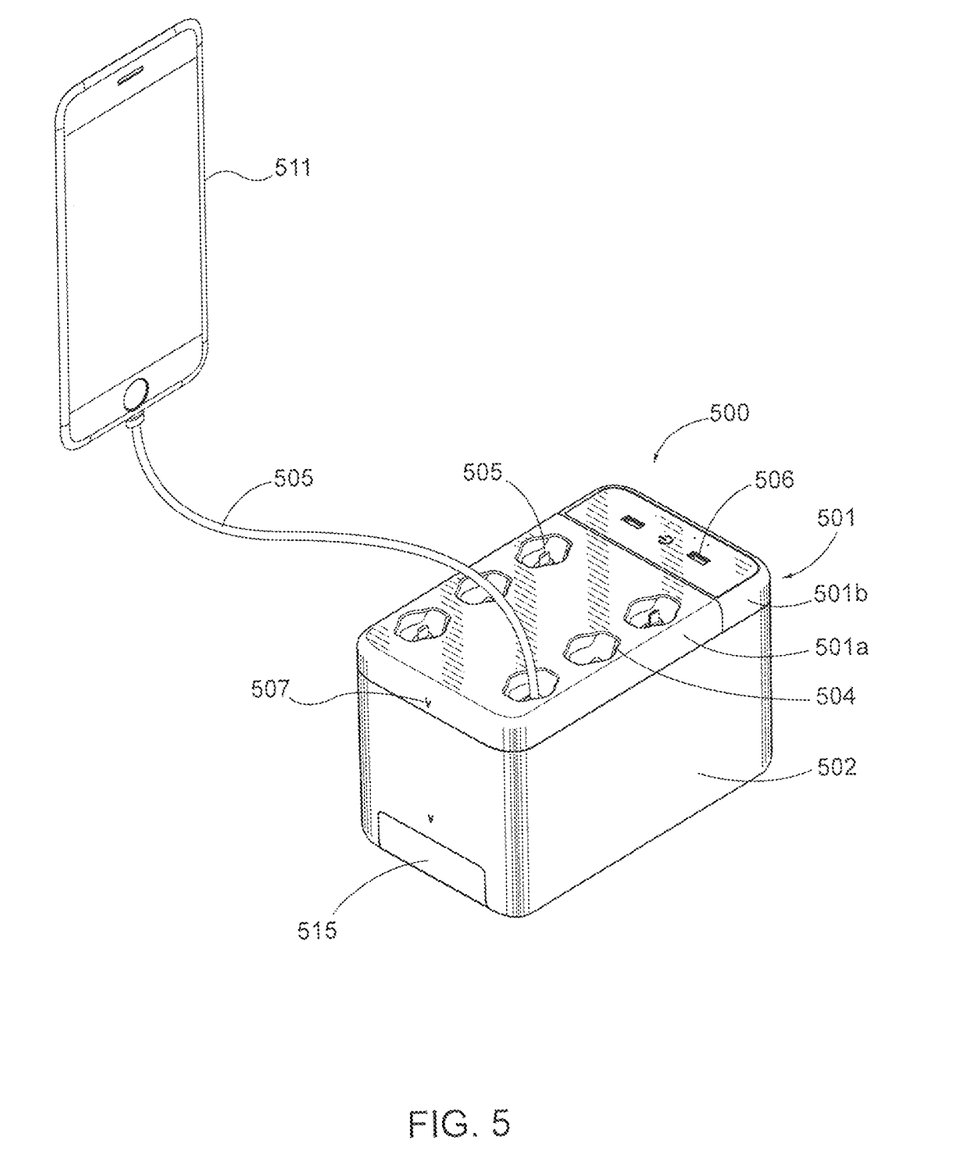
FIG. 5 shows front side view showing an embodiment of the present invention in use with a portable electronic device.

FIG. 5 shows a charging station according to another embodiment of the invention wherein a charging station housing 502 comprises six cord ports 404 configured as semi-circular depressions along an adjustable faceplate 501 including (optionally adjustable) members 501a and 501b, which permit a retracted charge cord 505 (shown extending from the interior of the charge station, from the charge port 504, to the exterior of the charge station 500 and connected to a portable electronic device 511) to be used to charge a portable electronic device 511. As shown in the figure, in this particular embodiment, adjustable faceplate 501 is configured with 6 charge ports 504 and two USB ports 506, along with a locking feature 507 for adjustable member 501a of faceplate 500, stationery member 501b, and a removable battery pack 513.

Figure 6:
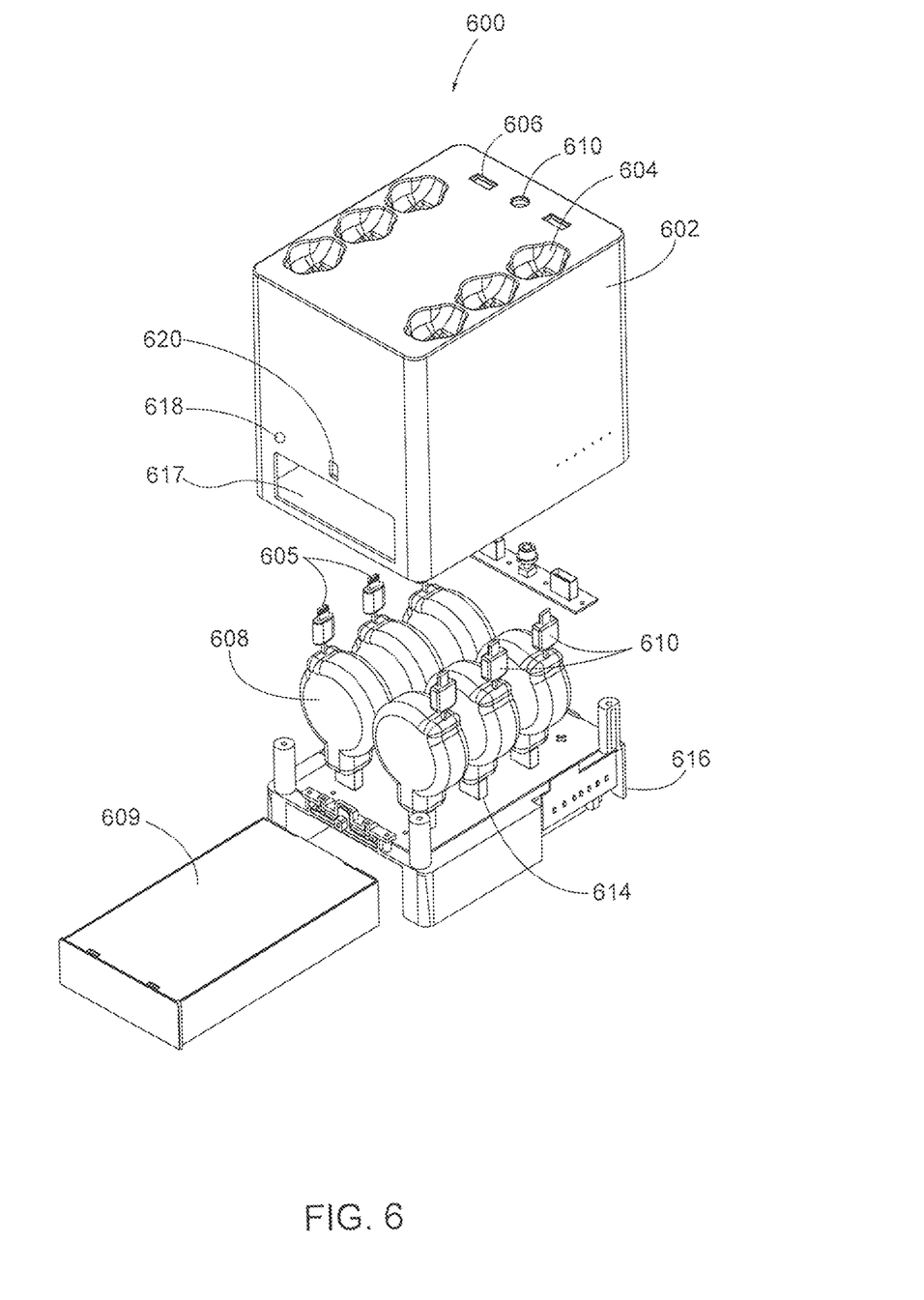
FIG. 6 is an exploded view of a charging station according to one embodiment of the invention illustrating the arrangement of removable rechargeable battery packs and interchangeable charging cartridges.

FIG. 6 shows an expanded view of a charging device 600 according to another embodiment of the present invention. The portable multiple mobile electronic device charging station 600 comprises a rectangular-shaped housing 602 configured with a plurality of charge ports 604, USB ports 606, one or more control features 610; within the housing is contained a plurality of removable and interchangeable charge cartridges 508 each comprising a retractable charge cord 605 windably attached with a spool mechanism (not shown), the charge cords 605 having a charge board connector end 614 for plugging into a charge board 616, and a device connector end 610, the device connector end 610 configured, when assembled, with device connector end 610 positioned on the upper outward surface of the upper face of housing 602, each charge cord held in position by device connector end 612; one or more access panels 617 for one or more removable battery packs 609; an audio jack 618 and a DC input jack 620 for an additional power source; and one or more indicators (not shown), such as: a battery replacement switch, a power indicator; security feature, such as a security lock feature for retaining the retractable cords in the charging station housing.

Throughout the disclosure, each charge cord comprises a device connector that may be a USB compatible device connector, for example: each device connector may be independently selected from a lightning connector, micro USB connector (e.g. micro-USB A, micro-USB B, or micro-USB 3.0), mini USB connector (e.g. USB mini-b (5 pin), or USB mini-b (4 pin). A device connecting end may also be referred to as a device connector of a charge cord.

Also included within the disclosure is the subject matter of the following paragraphs;

The disclosure provides a network-enabled portable charging station for multiple mobile electronic devices comprising a housing with an adjustable faceplate. The housing contains a rechargeable ion battery, or alternatively a rechargeable battery pack, a main charging board, and a cord housing, or alternatively a plurality of removable charge cord housing cartridges, wireless communications capability, and a wireless speaker. The housing comprises up to eight interchangeable and removable charge cord cartridges, and a faceplate with up to eight interface ports, which are configured to enable charging of connected electronic devices from the battery simultaneously. Cord housing cartridges may be removable and comprise retractable charging cords adapted for connection to one or both of a main charging board and a mobile electronic device.

The charging base may comprise an input and an output adaptor. One of the input adaptor and output adaptor may be male. The other of the input and output adaptor may be female. For example, the input adaptor may be female and the output adaptor may be male. The input adaptor provides an input for an input voltage that provides a voltage source to charge the rechargeable battery. The output adaptor provides an output for a voltage at the same or a similar level to the input voltage. The input voltage may be provided by an AC-DC, inverter cord that converts an AC source to 12 $V_{DC}$, for example a 120 $V_{AC}$ to 12 $V_{DC}$ inverter cord or a 230 $V_{AC}$ to 12 $V_{DC}$ inverter cord. The input voltage may be provided by the output adaptor of another charging base of a device of the invention.

This provides a compact arrangement for providing power to multiple, e.g. up to six, charging bases. For example an AC-DC inverter cord may be used to provide power (e.g. 12 $V_{DC}$) to a first charging base, with the output adaptor of the first charging base providing a voltage source for the input adaptor of the second charging base. The output adaptor of the second charging base may be connected to the input adaptor of a third charging base. Up to six charging bases of the disclosure, for example 2, 3, 4, 5 or 6 charging bases, may be connected in series in this manner, using a single external voltage input into the first charging base. This provides that the charging devices of the invention may be connected in a modular manner, providing scalability.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A portable charging station for multiple mobile electronic devices, the portable charging station comprising:
   a substantially cuboid housing;
   at least one rechargeable battery pack;
   at least one circuit board located within the housing, the at least one circuit board connected to the at least one rechargeable battery pack and comprising at least one USB port;
   at least one removable cord housing cartridge configured with a protective casing and a single-sided spool comprising a retractable charging cord, each retractable charging cord having a USB connector end for connecting to the at least one USB port and a device connector end for connecting to a mobile electronic device; and
   a removable faceplate configured with at least one USB port for receiving a USB-enabled charging cord and at least one opening for accessing each device connector end, wherein each removable cord housing may be removed and replaced while the faceplate is removed.

2. The portable charging station of claim 1, further comprising at least one feature selected from the group consisting of speakers, microphones, wireless communication means and combinations thereof.

3. The portable charging station of claim 1, wherein each retractable charging cord is configured to enable charging of connected electronic devices simultaneously at with up to four amperes of current per device.

4. The portable charging station of claim 1, wherein the device connector end of the retractable charging cord is extendable from the single-sided spool for a fixed distance of up to four feet and is retractable therefrom by pulling and releasing.

5. The portable charging station of claim 4, wherein the device connector end of the retractable charging cord is extendable from the spool for a fixed distance of up to three feet or up to two feet.

6. The portable charging station of claim 1, further comprising at least one advertising message on the exterior of the housing.

7. A method of charging at least one mobile electronic device, the method comprising connecting the at least one mobile electronic device to a device connector end of a retractable charging cord of the portable charging station according to claim 1.

8. The portable charging station of claim 1, wherein:
   the at least one rechargeable battery pack is a removable battery pack comprising at least one removable battery; and
   the at least one removable battery is rechargeable.

9. The portable charging station of claim 8, wherein the at least one removable cord housing cartridge may be removed and replaced when the removable faceplate is removed.

* * * * *